No. 4,235. REISSUED JAN. 17, 1871.

W. A. FENN.

MACHINE FOR FORMING THE BRIMS OF FELT HATS.

Inventor:
Wm. A. Fenn.
by J. Fraser & Co.
Attys.

Witnesses:
V. D. Stockbridge
Geo. E. Brown

THE NORRIS PETERS CO., PHOTO-LITHO., WASHINGTON, D. C.

UNITED STATES PATENT OFFICE.

WILLIAM A. FENN, OF ROCHESTER, NEW YORK.

IMPROVEMENT IN MACHINES FOR FORMING THE BRIMS OF FELT HATS.

Specification forming part of Letters Patent No. 17,033, dated April 14, 1857; reissue No. 4,235, dated January 17, 1871.

*To all whom it may concern:*

Be it known that I, WILLIAM A. FENN, formerly of New Milford, Connecticut, but now of the city of Rochester, county of Monroe, and State of New York, did invent a certain new and useful Improvement in Machines for Forming the Brims of Felt Hats, for which a patent was issued April 14, 1857; and I do hereby declare that the following is a specification thereof.

This invention relates to a machine for forming the brims of hats, consisting of mechanism whereby the brim is automatically fed or rotated and stretched radially and circumferentially, as more fully hereinafter described.

Figure 1:
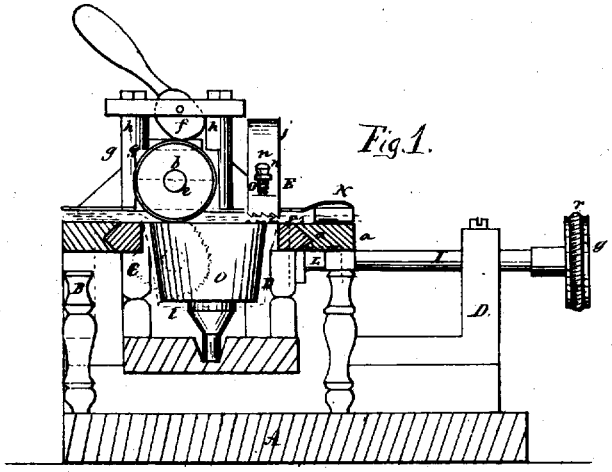
Figure 2:
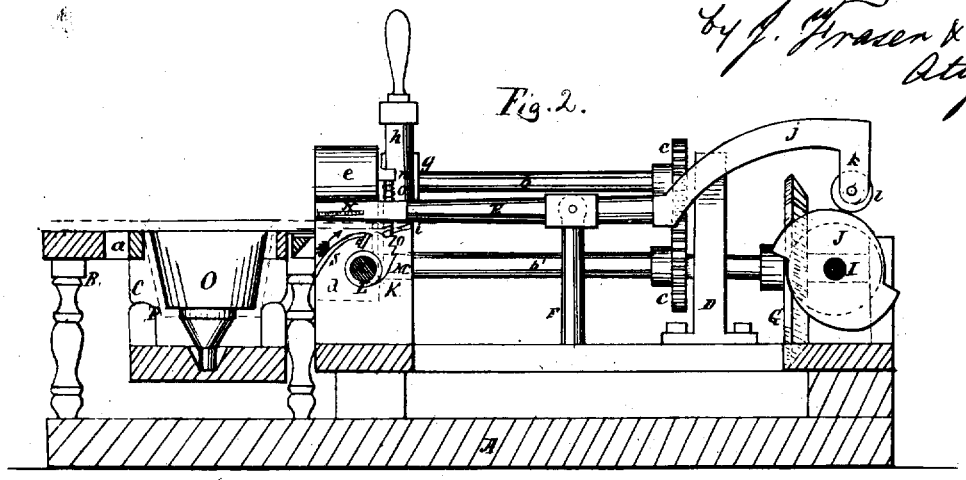
Figure 3:
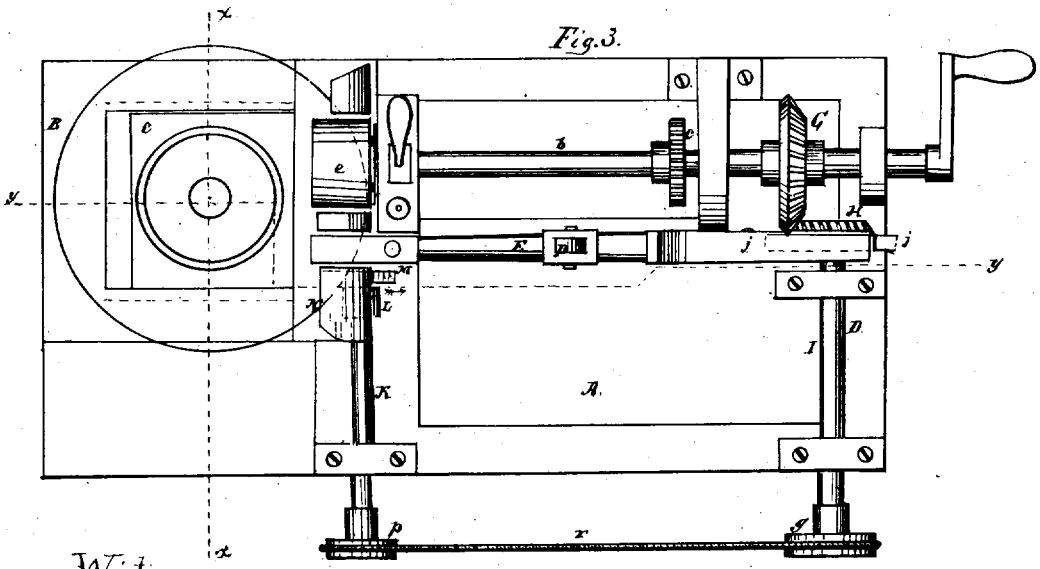

In the drawings, Figure 1 is a transverse vertical section of my machine in the plane of line *x x*, Fig. 3. Fig. 2 is a longitudinal vertical section in line *y y*, Fig. 3. Fig. 3 is a plan of the machine.

A represents a horizontal bed or platform, on which a framing, B, is placed, said framing having ways or guides *a a* on its upper part, in which the upper end of a smaller frame, C, is fitted, a certain degree of play being allowed to the frame C within the framing B.

D also represents a framing placed on the bed or platform A adjoining the framing B. In the framing D two shafts, *b b'*, are placed, the shafts being in the same plane, one above the other and connected by gear-wheels *c c*. To one end of these shafts are attached conical rollers *d e*, the upper being pressed down upon the lower when necessary by a cam, *f*, which is placed over and acts upon the bearing *g* of the shaft *b*, the bearing being fitted between guides *h h* and resting upon springs *i i* placed on said guides.

E represents a bar or lever, which is pivoted to the upper end of an upright, F, in the framing D. One end of this lever is curved, as shown at *j*, Fig. 2, and has a pendant, *k*, attached, said pendant having a friction-roller, *l*, placed in its lower end.

The opposite end of the bar or lever E projects over a bed, *m*, the upper surface of which may be corrugated longitudinally, and the under surface of the bar E corrugated in a similar manner.

A vertical rod, *n*, passes through the bar E, said rod serving as a guide. The rod *n* has a spiral spring, *o*, upon it, said spring having a tendency to keep the end of the bar up free from the bed *m*.

On the lower roller-shaft, *b'*, a beveled toothed wheel, G, is placed, and this wheel gears with a pinion, H, on the shaft I, placed in the framing D, and at right angles to the lower shaft, *b'*.

On the shaft I and adjoining the pinion H a cam, J, is placed, the form of which is shown clearly in Fig. 2. The friction roller *l*, in the pendant *k*, is made to bear upon the periphery of the cam J by the spring *o*.

K is a shaft, which is fitted in the framing D, parallel with the shaft I, and at the opposite end of the framing. The shaft K has a pulley, *p*, on its outer end, and a pulley *q* is placed upon the outer end of the shaft I, a belt, *r*, passing around the two pulleys.

On the inner end of the shaft K a collar, L, is placed, and this collar has a segment, M, attached to it, said segment having a serrated periphery and a serrated plate, *s*, attached to it. This serrated plate is shown in Fig. 2.

N represents a guide or looped plate, which is attached to the upper part of the framing B, the loop extending over the framing B and having spaces cut out from it, so that it will not interfere with the operation of the bar E, rollers *d e*, and segment M.

O represents a hat-block placed within the smaller frame, C. The top of the block rests upon a bed or block, *t*, which is allowed to rotate or turn freely at the bottom of the frame C. This block holds the body of the hat while the brim passes within the looped or guide plate N, and then passes between the rollers.

Motion is given the lower roller-shaft, *b'*, in any proper manner, and the rollers *d e* rotate the hat-brim. The bar or lever E has a vibrating motion given it by the cam J, and the segment M, as well as the rollers *d e*, have a continuous rotary motion. Each time the bar or lever E is depressed the brim of the hat is clamped between the end of said bar or lever and the bed *m*, and the movement of the brim is checked for an instant, and as the rollers *d e* have a constant movement, it follows that the brim is not only rotated by the rollers, but also stretched circumferentially. The serrated segment M, with plate *s* attached, stretches or straightens the brim in a radial direction, the segment rotating in the direction indicated by the arrow. (See Figs. 2 and 3.)

What I claim, and desire to secure by Letters Patent, is—

1. In combination with mechanism for stretching the brim radially, the conical rollers for feeding or rotating the hat-body.

2. In combination with feed-rollers having a continuous rotation, mechanism for arresting the moving brim, whereby the same is stretched circumferentially.

3. Rollers for feeding forward the hat-brim, an intermittent clamping mechanism for arresting the progress of the brim, and an intermittent radially-stretching mechanism, combined and coacting as described.

4. In combination with the feeding-rollers, the guide or plate N, operating in the manner and for the purpose specified.

5. The combination of the bar E, rod *n*, spring *o*, cam J, and serrated bed *m*, operating in the manner and for the purpose specified.

In witness whereof I have hereunto signed my name in the presence of two subscribing witnesses.

WM. A. FENN.

Witnesses:
R. F. OSGOOD,
G. WILLM. MIATT.